Figure 1:
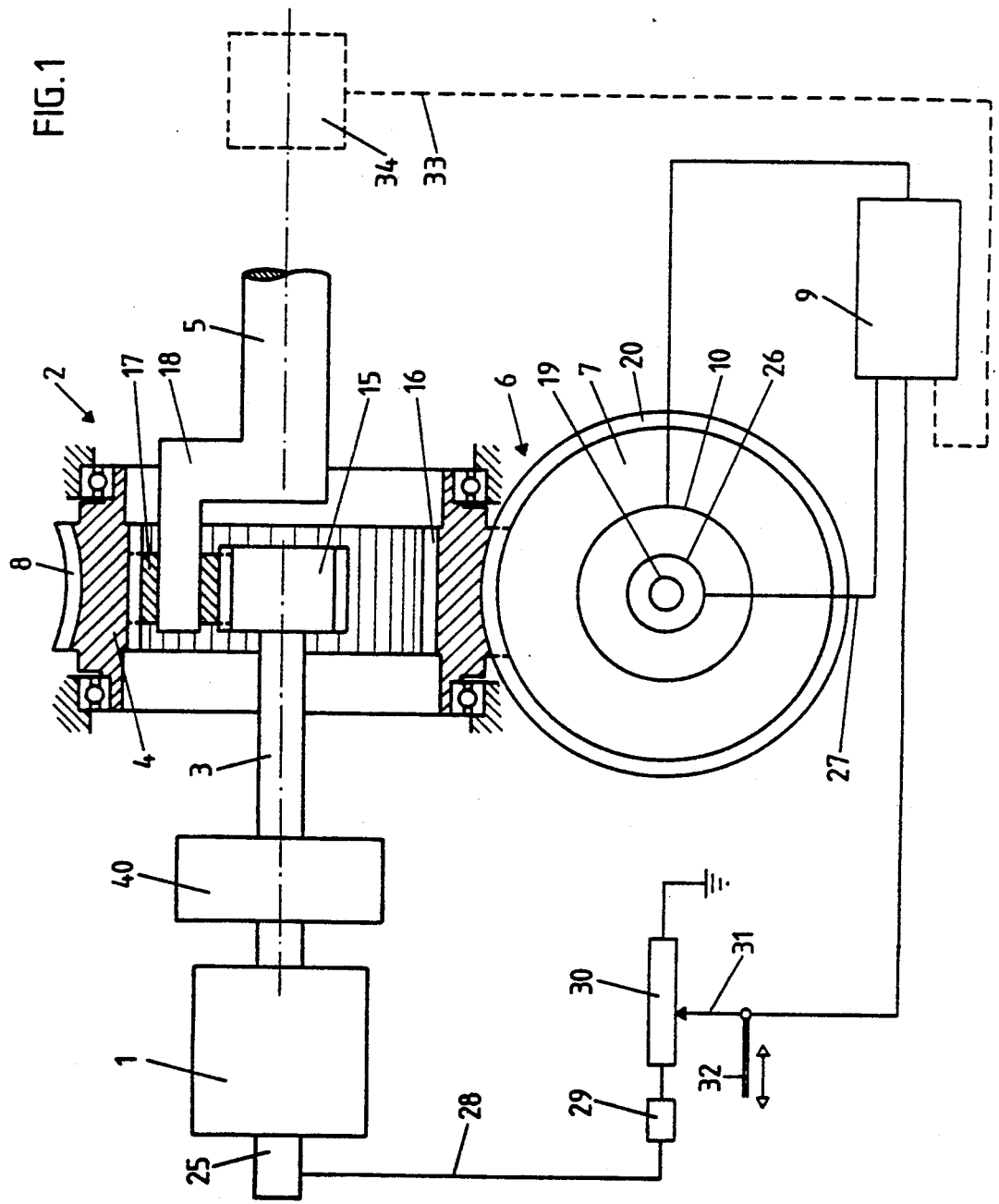

United States Patent [19]

Frey

[11] Patent Number: 5,015,898

[45] Date of Patent: May 14, 1991

[54] CONTINUOUSLY VARIABLE DRIVE

[76] Inventor: Heinz Frey, Hirtenhofstrasse 18, CH-6005 Luzern, Switzerland

[21] Appl. No.: 365,159

[22] PCT Filed: Aug. 29, 1988

[86] PCT No.: PCT/CH88/00149

§ 371 Date: May 8, 1989

§ 102(e) Date: May 8, 1989

[87] PCT Pub. No.: WO89/02550

PCT Pub. Date: Mar. 23, 1989

[30] Foreign Application Priority Data

Sep. 9, 1987 [CH] Switzerland .................. 3479/87

[51] Int. Cl.[5] ................... H02K 24/00; F16H 1/16
[52] U.S. Cl. ................... 310/83; 74/89.14; 74/425; 318/618
[58] Field of Search ............ 310/83, 80; 74/89.14, 74/425; 318/610, 611, 618

[56] References Cited

U.S. PATENT DOCUMENTS 4,208,930  6/1980  Hermann .................. 74/476
4,268,343  5/1981  Schulze .................... 74/69
4,619,151 10/1986  Trachman et al. ......... 74/89.14

FOREIGN PATENT DOCUMENTS 0272206  5/1927  United Kingdom ................. 310/83
735147  8/1955  United Kingdom ................. 310/83

OTHER PUBLICATIONS

Hall, "Worm Gears", Schaum's Outline Series, *Machine Design* (prior to 1980) pp. 249–251.

Primary Examiner—Steven L. Stephan
Assistant Examiner—D. L. Rebsch
Attorney, Agent, or Firm—Blum Kaplan

[57] ABSTRACT

A drive motor (1) with a shaft (3) drives a power takeoff shaft (5) via a planetary differential gear (2). The second input shaft (4) of the gear (2) is connected to a servo motor (10) via a worm gear (6). The worm (7) of the worm gear (6) is at least half as large as the worm gear (8). The pitch angle of the thread of the worm gear (20) lies between 5° and 9°. The rotational speed of the servo motor is controlled by a control (9). As a result of this design, a large controllable range of rotational speed is achieved with a lower power output from the servo motor. In this way, a large output power can be precisely regulated with little regulation effort. The drive has a high dynamic ratio and is suitable, for example, for cranes and elevators.

10 Claims, 2 Drawing Sheets

CONTINUOUSLY VARIABLE DRIVE

A continuously variable drive according to the definition of the species of claim 1 is known from the DE-OS 24 15 859. With this known drive, a motor drives a cage with radially oriented bevel wheels, via an angular reduction gear. The bevel wheels engage two ring gears. One ring gear is connected to a power takeoff shaft. A servo motor drives the other ring gear via a worm reduction gear. The worm gear is designed so that it is just barely self-locking. When the drive motor has a constant rotational speed, the rotational speed of the power takeoff shaft can be controlled with relatively little effort by varying the rotational speed of the servo motor. However, the power expended by the servo motor depends strongly on the rotational speed, and the rotational speed can be controlled down to stoppage or even to a reversal of the sense of rotation only with a strong stepdown in the angular gear. The maximum rotational speed of the power takeoff shaft is thus much less than the rotational speed of the drive motor.

On the other hand, there are other proposals, with a similar basis, that provide for less reduction between the drive motor and the power takeoff shaft. However, with these proposals the rotational speed of the power takeoff shaft can be varied only over a narrow range about the rated speed.

It is an object of the invention to further develop a drive of the type mentioned in the introduction in such a fashion that the rotational speed of the driveshaft can be varied over a broad range with little power on the part of the element that controls the rotational speed. This object is achieved by the characteristic features of claim 1.

With standard worm gears, the ratio of the worm diameter to the worm wheel diameter is significantly below 0.4, because otherwise efficiency is too poor. However, in the inventive application the choice of a large worm yields significant advantages: (a) The stepdown ratio of the worm gear becomes less and thus a broader range of rotational speed for the power takeoff shaft can be achieved while the range of rotational speed of the member controlling the rotational speed remains the same; (b) Surprisingly it has appeared that, with a constant torque of the worm wheel, the torque of the worm with a large worm diameter depends much less on the rotational speed than with a small worm diameter. In this way, a large takeoff power can be regulated with a very small power on the part of the element which controls the rotational speed.

The pitch angle of the thread of the worm gear is chosen so that the worm gear is just barely not self-locking when it is running. The element which controls rotational speed therefore acts mainly as a brake. Here the worm gear is used "upside down" compared to standard worm gears, because the worm gear is seated on the drive side, while the worm is seated on the output side. In this "upside down" arrangement, the worm gear has very poor efficiency, so that the controlled braking power of the element which controls the rotational speed amounts to only a few percent of the drive power of the drive motor.

An embodiment of the invention is explained below by way of the drawing. Here FIG. 1 schematically shows a first embodiment and FIG. 2 a second embodiment.

The drive according to FIG. 1 comprises: a drive motor 1, a differential gear 2 with two input shafts 3, 4 and one output shaft 5, a worm gear 6 with a worm 7 and a worm wheel 8 connected to a shaft 4, and a servo motor 10 controlled by a control 9. The differential gear 2 is a planetary gear and has a sun wheel 15 seated on the shaft 3, a coaxial sprocket wheel 16 connected to the shaft 4, and planetary gears 17 distributed over its circumference, only one of which is shown, and which engage the sun wheel 15 and the sprocket wheel 16. The planetary wheels 17 are rotatably mounted on a planetary support 18. The planetary support 18 is rigidly connected to the shaft 5.

The worm 7 is seated on the output shaft 19 of the servo motor 10. The gear of the worm 7 has a pitch between 5° and about 9°, preferably about 7°. The drive motor 1 has a rotational speed transducer 25 and the servo motor has another rotational speed transducer 26. The output 27 of the transducer 26 is switched onto the control 9. The output 28 of the transducer 25 is connected, as a disturbance, via a dropping resistor 29, to a potentiometer 30, whose other side is grounded. The tap 31 of the potentiometer 30 is conducted to the control 9 as a theoretical value. In the example shown, the tap 31 can be adjusted by a manually activated element 32. The output of the control 9 is connected to the servo motor 10. In addition to or in place of the disturbance connection via the transducer 25, a signal 33 from another transducer 34 can be inputted into the control 9, where this transducer 34 is connected to the power takeoff shaft 5. Depending on the type of control desired, the transducer 34 can measure the rotational speed or the rotational angle of the power takeoff shaft 5.

During operation the motor turns at an essentially constant but unregulated speed. As long as the shaft 4 is at rest, the power takeoff shaft is driven with a stepdown ratio which is determined by the diameters of the sun wheel 15, the sprocket wheel 16, and the planetary wheels 17. The driving torque exerts a torque on the shaft 4 and thus moves the worm wheel 8 against the rotational direction of the shaft 3. If the worm 7 is now turned in the sense that the shaft 4 turns in the direction of the torque acting on it, the rotational speed of the power takeoff shaft 5 is reduced. Since the worm gear 6 is almost self-locking, only a very small torque in the driving sense is here transmitted to the worm 7. The servo motor 10 acts primarily as a brake. The control 9 regulates the rotational speed of the worm 7 via the servo motor 10 to the theoretical value inputted at the element 32. If the takeoff torque at the shaft 5 is increased, the torque to be applied by the motor 1 also increases directly. Since this motor 1 is not regulated, the rotational speed of the shaft 3 therefore also falls. The transducer 25 senses this change, and inputs it to the control 9 via the potentiometer 30 and the tap 31. As a result, the worm 7 also turns more slowly. The disturbance connection is designed so that the rotational speed of the power takeoff shaft 5 is independent of the magnitude of the takeoff torque. When the servo motor 10 turns so fast that the sun wheel 15 and the sprocket wheel 16 have the same circumferential speeds, the shaft 5 is at rest. If the sprocket wheel 16 turns faster, the shaft 5 runs backwards. However, if the small output of the servo motor 10 remains the same, this is possible only if the takeoff torque acts in the same original sense of rotation. Examples of such applications are cranes, winches, or elevators. In these applications, it is suitable to design the drive motor 1 and the servo motor 10 as stop motors. Such stop motors have a brake which blocks the motor shaft when the power supply switches off. When the power is switched off, the rotational speed of the power takeoff shaft 5 is first reduced to 0, and the drive motor 1 is switched off. Here the control 9 slows down the servo motor 10 synchronously with the reduction of the rotational speed of the shaft 3. As a result, the shaft 5 remains stationary. Upon power-on, the control 9 inversely is first put in operation with the servo motor 10, and thereupon the motor 1 is switched on. As a result of the disturbances connection, the servo motor 10 runs up synchronously with the shaft 3.

To achieve a wide range of rotational speed for the power takeoff shaft 5, the diameter of the worm 7 is at least half as large, but preferably at least as large as the diameter of the worm wheel 8. This results in a stepdown which is unusually small for worm gears. For a given maximum rotational speed of the servo motor 10, a high rotational speed of the shaft 4 can therefore be achieved. If the rotational speed of the power takeoff shaft 5 is to be varied down to stoppage, it is suitable to choose the step-down ratio between the shaft 3 and the shaft 5 the same as the step-down ratio between the shaft 19 and the shaft 5. The motors 1 and 10 then have the same nominal rotational speeds.

The drive described here has a very high dynamic ratio because, for a rotational speed change of the shaft 5, only the rotational speed of the shaft 4, of the worm gear 6, and of the servo motor 10 must be changed, and these have comparatively low moments of inertia. In contrast to power servo motors, the acceleration capacity can even be improved still further here, if a flywheel 40 is placed on the shaft 3.

In the drive described here, the torque at the input shaft 3 is proportional to the torque at the power takeoff shaft 5, independent of their rotational speed. The takeoff torque therefore can be measured directly by the power consumption of the motor 1. This is especially useful for application in cranes and elevators, to secure against overload. As the rotational speed of the power takeoff shaft 5 decreases, the efficiency also decreases. When the power takeoff shaft 5 is at rest, efficiency reaches the value 0. This is also the case with power servo motors. In contrast to these, the excess power is not dissipated in heat by the electronics, but it causes the gear oil to heat up. This off-heat can thus be dissipated simply, safely, and cheaply, e.g. through an oil cooler. By contrast, the dissipation of heat from power electronics represents a considerable problem of continuously variable drives with high-power servo motors, and among other things also represents a safety risk.

If the torque of the power takeoff shaft 5 is to act in both directions, it is suitable to design the drive motor 1 and the servo motor 10 so that they are reversible. Alternatively, it is also possible to dispose a reversing gear between the motor 1 and the shaft 3 or after the shaft 5. Instead of the servo motor 10, one can also use an electrically, mechanically, pneumatically, or hydraulically controllable brake.

Figure 2:
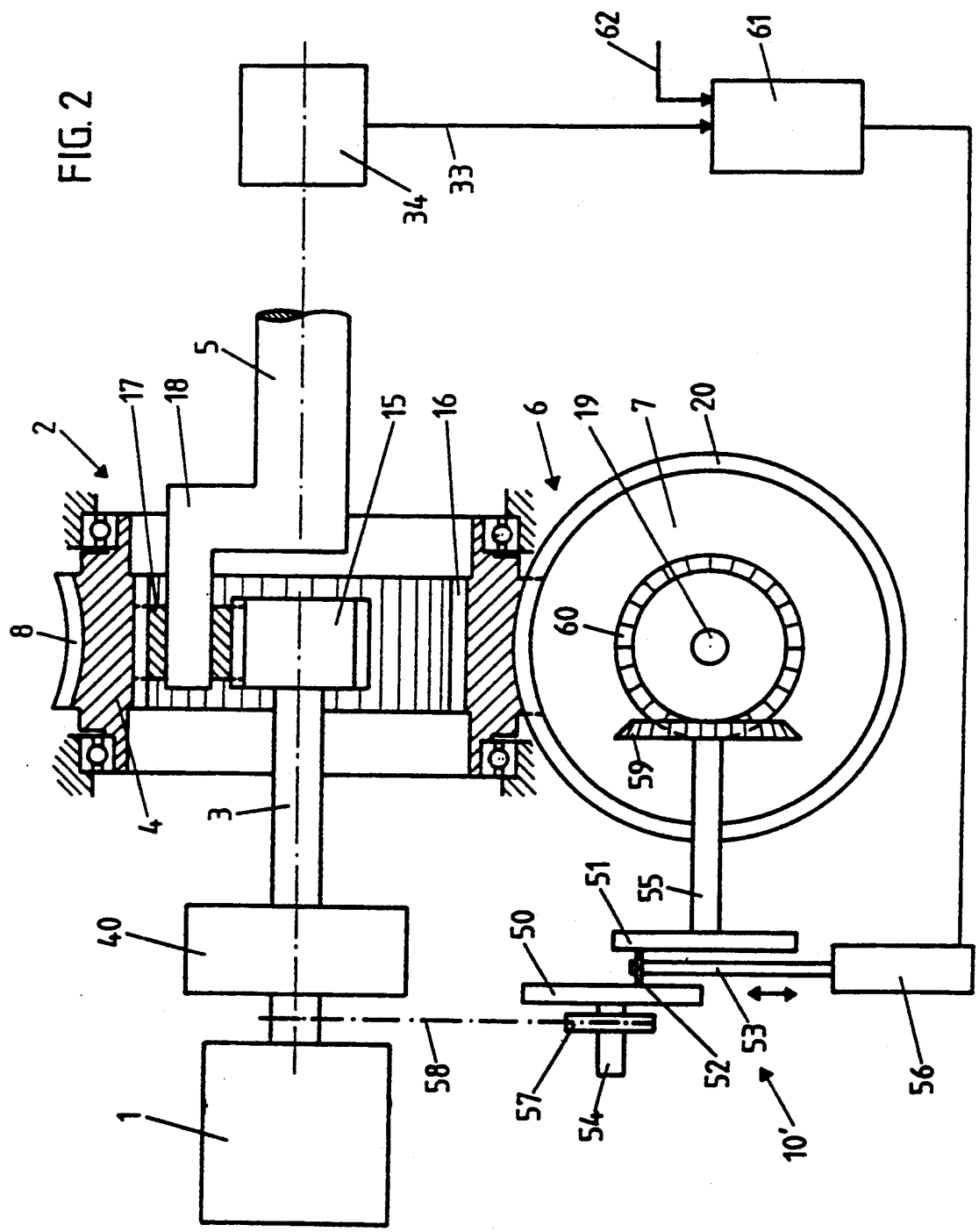

In the embodiment according to FIG. 2, the same reference symbols are used for the same parts, so that a detailed description of the gear 2 and of the worm gear 6 is obviated. The element 10', whose rotational speed can be controlled, is here designed as a friction-wheel transmission comprising two parallel, radially displaced, rotatable disks 50, 51 as well as a friction wheel 52. The friction wheel 52 rolls on the two disks 50, 51 and is rotatably mounted on a rod 53. The rod 53 is oriented perpendicular to the two shafts 54, 55 of the disks 50, 51. It can be moved along its axis by means of a lifting element 56. The disk 50 is connected to the driveshaft 3 through a gear wheel 57 and a toothed belt 58. The disk 51 is connected to the shaft 19 of the worm 7 through two double wheels 59, 60. By moving the rod 53, the transmission ratio of the friction wheel transmission 10' can be continuously regulated. In the simplest case, the rod 53 is moved manually, where the lifting element 56 e.g. comprises a crank with a nut, and the rod 53 is designed as a threaded rod which engages the nut. In the case shown, the lifting element 56, on the other hand, is an electrically, hydraulically, or pneumatically activated servo motor, which is driven by a control 61. The control 61 has a theoretical-value input 62. The actual-value 33 is again delivered by the transducer 34, which measures the angle and/or the angular speed of the power takeoff shaft 5.

Instead of the friction wheel transmission 50, 51, 52, other continuously variable, mechanical transmissions are also suitable, e.g. variators. In actual operation, the embodiment according to FIG. 2 works analogously to that according to FIG. 1. Here too, only a very small power is transmitted through the continuously variable transmission 10', so that this element can be made easily and cheaply and has a high dynamic ratio. The motor 1 here can also be an internal combustion engine or a steam or gas turbine.

In the two embodiments shown, the function of the shafts 3, 4, and 5 can be mutually interchanged, depending on the drive motor 1, the rotationally controllable element 10, 10', and the rated rotational speed of the power takeoff shaft.

I claim:

1. A continuously variable drive comprising a drive motor (1), a differential gear (2) with a first and a second input shaft (3, 4) and a power takeoff shaft (5), a worm gear (6) with a worm (7) and a worm wheel (8), as well as a rotationally controllable element (10) having an output shaft (19), where the drive motor (1) is connected to the first input shaft (3), the worm wheel (8) is connected to the second input shaft (4), and the worm (7) is connected to the output shaft (19) of the rotationally controllable element (10), wherein the diameter of the worm (7) is chosen to be at least half as great as the diameter of the worm wheel (8), and wherein the pitch angle of the worm gear threads (20) is chosen so that the worm gear (6) is just barely not self-locking when the worm (7) is running, first means (25) for measuring rotational speed of the drive motor (1) and generating a first output signal (28) and second means (26) for measuring rotational speed of the output shaft (19) of rotationally controllable element (10) and generating a second signal (27), and a controller (9) having a first input (31) and a second signal (27), the first input (31) coupled to the first shaft (3) and the second input (27) coupled to the output shaft (19) of rotationally controllable element (10) for controlling the speed of rotationally controllable element (10).

2. The drive of claim 1, wherein the worm (7) has a larger diameter than the worm wheel (8), and wherein the pitch angle of the worm gear thread is 5° to 9°.

3. The drive of claim 1 wherein the differential gear (2) is designed as a planetary gear.

4. The drive according to claim 1, wherein the rotation direction of the first input shaft (3) and of the worm (7) is reversible.

5. The drive according to claim 1, wherein the rotationally controllable element (10) is a servo motor.

6. The drive according to claim 5, wherein the drive motor (1) and the servo motor (10) are designed as stop motors.

7. The drive according to claim 1, wherein the rotationally controllable element (10') comprises a continuously variable mechanical transmission (50, 51, 52) which on the one end is connected to the first input shaft (3) and on the other end is connected to the worm (7).

8. The drive according to claim 1, wherein a flywheel (10) is coupled with the first input shaft (3).

9. The drive according to claim 1, wherein the input of control (9) which controls the rotationally controllable element (10) includes a selectively variable input (32) for varying the first output (28) signal from first means (25) for measuring the rotational speed of the motor (1).

10. The drive according to claim 1, wherein a transducer (34) is coupled with the power takeoff shaft (5), to measure the angle and/or the angular speed, the output (33) of said transducer (34) being connected to a control (9, 61) which controls the rotationally controllable element (10).

* * * * *